June 8, 1971          H. C. METZ          3,582,991
COMBINED WELDING AND GRINDING SHIELD
Filed Dec. 29, 1969          2 Sheets-Sheet 1
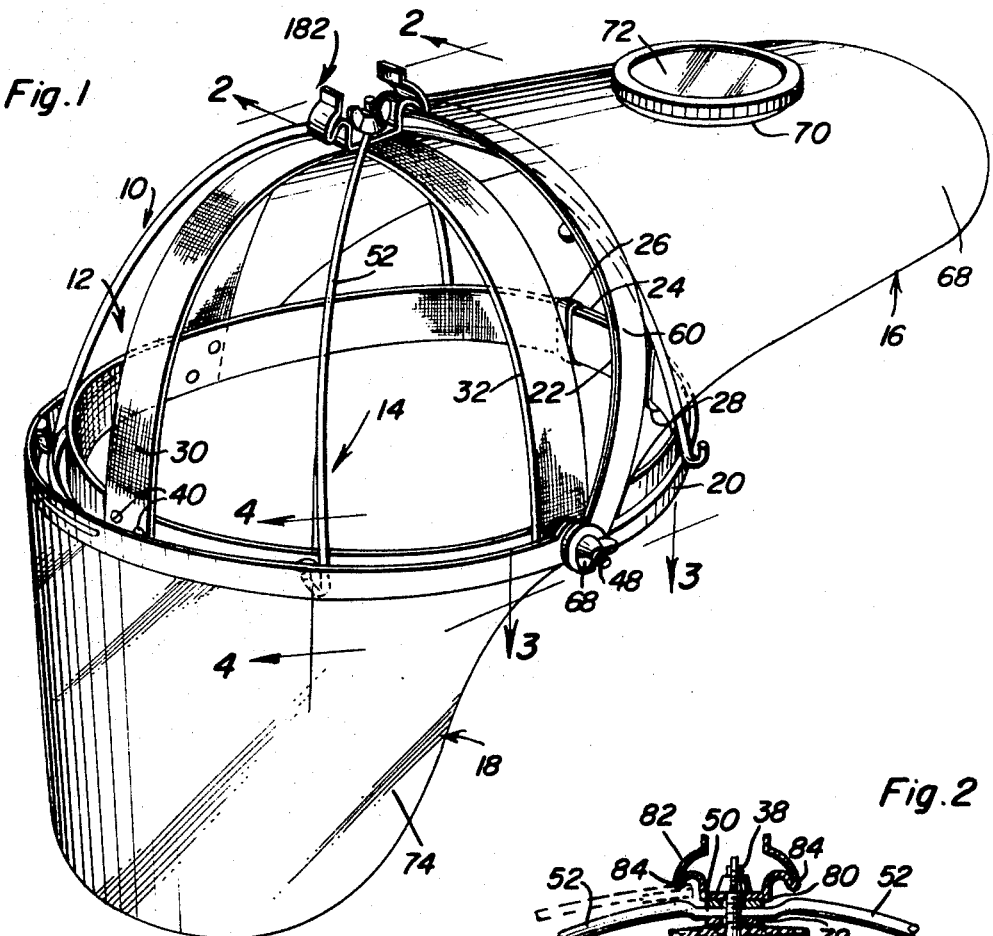
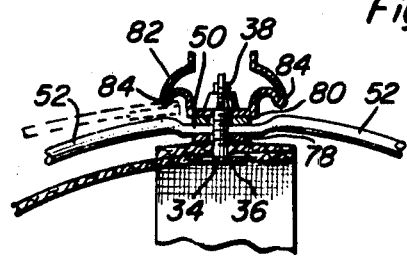
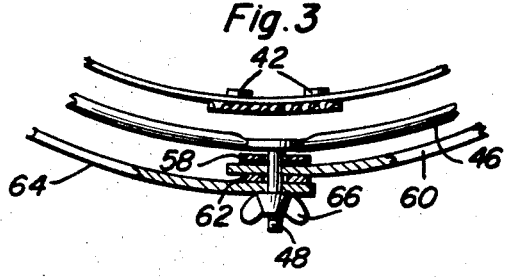
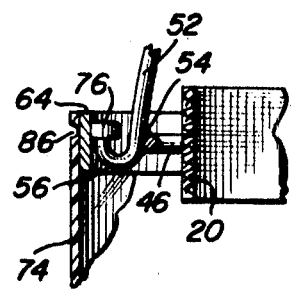
Harold C. Metz
INVENTOR.
BY Clarence A. O'Brien
and Harvey B. Jacobson
Attorneys June 8, 1971    H. C. METZ    3,582,991
COMBINED WELDING AND GRINDING SHIELD
Filed Dec. 29, 1969    2 Sheets-Sheet 2
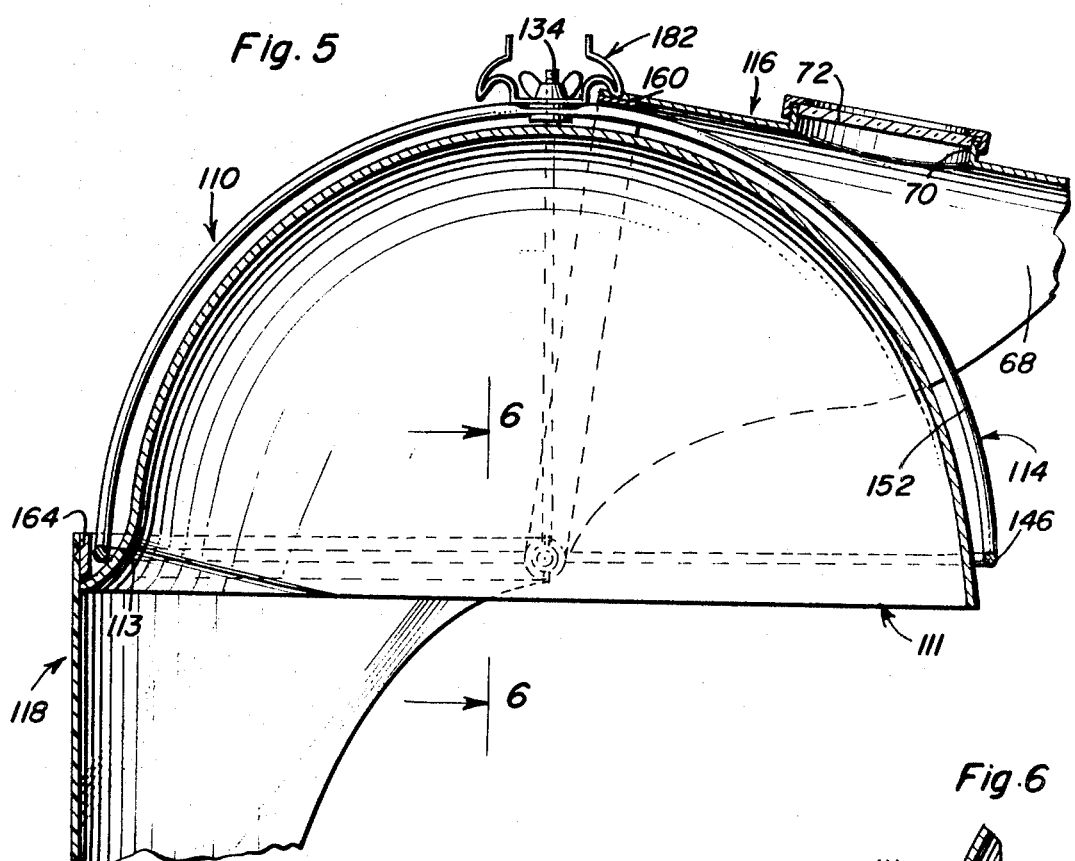
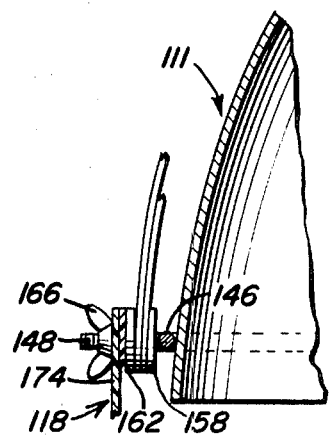
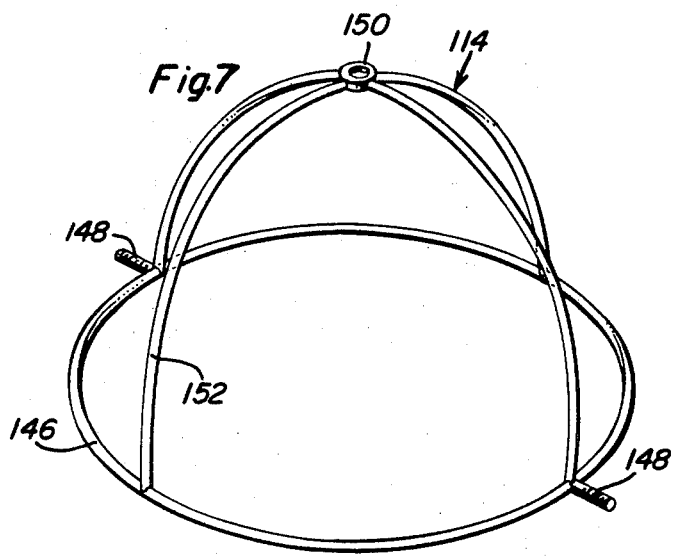
Harold C. Metz
INVENTOR
BY Clarence A. O'Brien
and Harvey B. Jacobson
Attorneys

United States Patent Office 3,582,991
Patented June 8, 1971

3,582,991
COMBINED WELDING AND GRINDING SHIELD
Harold C. Metz, Star Rte., Williamsburg, N. Mex. 87942
Filed Dec. 29, 1969, Ser. No. 888,474
Int. Cl. A61f 9/06
U.S. Cl. 2—8        10 Claims

ABSTRACT OF THE DISCLOSURE

A downwardly opening headpiece for downward placement on and support from the head of a workman. The headpiece includes an upper central portion from which a rotatable support is mounted for rotation about an upstanding axis centrally disposed relative to the headpiece and a pair of eye shielding structures are oscillatably supported from the rotatable support for oscillation about generally parallel horizontal axes extending between a first pair of remote side portions of the headpiece between closely adjacent raised positions disposed above a second pair of remote side portions of the headpiece and oppositely downwardly swung active positions depending from the aforementioned second pair of remote side portions of the headpiece.

---

The combined welding and grinding shield of the instant invention has been designed to provide a means whereby a metal workman may alternately perform welding and grinding operations without having to remove his welding helmet after a welding operation and don a grinding shield prior to beginning the grinding operation.

Although some welders do not also perform grinding operations, other welders, especially those engaged in fabrication work, are frequently required to alternately perform welding and grinding operations. When such alternate operations are performed, the welder loses considerable time in switching from a welding shield or helmet to a grinding shield. Of course, the switch from a welding shield to a grinding shield after performing a welding operation and before performing a grinding operation is necessary inasmuch as a welder cannot see clearly through a welding shield under usual illumination conditions. Likewise, a welder cannot perform welding operations while wearing a transparent grinding shield inasmuch as the light from the welding operation will have deleterious effects on his eyes. Therefore, heavy light filtering shields are used for welding purposes and transparent shields are used for grinding purposes.

Accordingly, in order to prevent the loss of time which is required to switch from a welding helmet to a grinding shield and vice versa, the main object of this invention is to provide head gear including both welding and grinding eye shields.

Another object of this invention, in accordance with the immediately preceding object, is to provide head gear whose welding and grinding shields may be readily shifted between operative positions in front of the eyes of the wearer of the head gear and inoperative positions disposed in out-of-the-way positions.

A still further object of this invention is to provide a combined welding and grinding shield whose structural component may be readily incorporated into the manufacture of various types of head gear worn by workmen during the performance of welding and/or grinding operations.

Still another object of this invention is to provide a combined welding and grinding shield attachment for a hard hat whereby the grinding and welding shields may be selectively used by a person wearing a hard hat and thus protected from objects falling from above.

A final object of this invention to be specifically enumerated herein is to provide a combined welding and grinding shield which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of head gear to be worn on the head of a workman and constructed in accordance with the present invention so as to provide selectively usable welding and grinding shields, the grinding shield being illustrated in the operative position and the welding shield being illustrated in an out-of-the-way inoperative position;

FIG. 2 is an enlarged fragmentary vertical sectional view taken substantially upon the plane indicated by section line 2—2 of FIG. 1;

FIG. 3 is a fragmentary enlarged horizontal sectional view taken substantially upon the plane indicated by the section line 3—3 of FIG. 1;

FIG. 4 is an enlarged fragmentary vertical sectional view taken substantially upon the plane indicated by section line 4—4 of FIG. 1;

FIG. 5 is a vertical sectional view of a modified form of head gear of the "hard hat" type and constructed in accordance with the present invention;

FIG. 6 is a fragmentary vertical sectional view taken substantially upon the plane indicated by section line 6—6 of FIG. 5; and FIG. 7 is a perspective view of the support frame portion of the instant invention which is rotatably supported from the associated hard hat and from which the welding and grinding shield portion of the instant invention are oscillatably supported.

Referring now more specifically to the drawings the numeral 10 generally designates a first form of combined welding and grinding shield constructed in accordance with the present invention. The shield 10 includes a downwardly opening headpiece referred to in general by the reference numeral 12, a support frame referred to in general by the reference numeral 14 and a pair of shields generally referred to by the reference numerals 16 and 18.

The headpiece 12 includes an adjustable diameter flexible cylindrical band 20 including overlapped end portions 22 and 24 secured together for relative longitudinal sliding adjustment by means of a pair of clips 26 and 28 spaced circumferentially about the band 20. Accordingly, the band may be adjusted in circumference so as to be adapted for snug fit on different size heads.

The head portion further includes a downwardly and forwardly opening quarter cylindrical band 30 and a downwardly opening half cylindrical band 32. The upper end of the quarter circular band 30 is secured to the mid-portion of the band 32 by means of a fastener 34 secured therethrough. The fastener 34 includes a head 36 and a threaded shank portion 38.

The lower end of the quarter circular band 30 is secured to the rear portion of the band 20 by means of rivets 40 and the free ends of the band 32 are secured to opposite side portions of the band 20 by means of rivets 42.

The support frame 14 includes a main horizontal circular ring 46 whose opposite side portions include horizontally outwardly projecting threaded studs 48. In addition, the support frame 14 includes an upper washer portion 50 outwardly and downwardly from which four circumferentially spaced quarter circular ribs 52 extend. The lower ends of the ribs 52 are secured to the circular ring 46 as at 54 and include terminal outwardly and upwardly curved hook portions 56.

An inner washer 58 is disposed on each outwardly projecting threaded shank portion 48 and the opposite ends of a one-half cylindrical support band 60 are journalled on the shank portions 48 outwardly of the washers 56. In addition, a second pair of outer washers 62 are disposed on the shank portions 48 outwardly of the ends of the support band 60 and the opposite ends of a half cylindrical support band 64 are journalled on the shank portions 48 outwardly of the outer washers 62. Finally, a pair of wing nuts 66 are threaded on the outer end of the shank portions 48 outwardly of the opposite ends of the support band 64 and may be tightened to provide any degree of frictional resistance to oscillation of the support bands 60 and 64 relative to the circular ring 46.

The support band 60 supports a partially cylindrical opaque shield panel 68 therefrom and which depends downwardly from the support band 60 when the latter is horizontally disposed. The shield panel 68 has a central opening 70 formed therein in which a light filtering glass 72 or the equivalent is supported and through which the wearer of the shield 10 may view his work while he is welding.

The support band 64 has a generally partial cylindrical shield panel 74 supported therefrom and which depends from the support band 64 when the latter is horizontally disposed. In addition, each of the bands 60 and 64 include circumferentially spaced inwardly projecting lugs 76 abuttingly engageable with the free ends of the hook portions 56 to limit downward swinging movement of the bands 60 and 64 to positions with the latter horizontally disposed. Accordingly, it may be seen that the shield 16 comprises the support 60 and the shield panel 68 while the shield 18 comprises the support band 64 and the shield panel 74.

The overlapped upper portions of the bands 30 and 32 are disposed on the shank portion 38 immediately above the head 36 of the fastener 34. Above these overlapped portions is disposed a lower washer 78 below the washer or washer portion 50 and a second upper washer 80 is disposed on the shank portion 38 and includes portions 84 which are engageable in complementray recesses or grooves 86 formed in each of the shield panels 68 and 74 whereby the shields 16 and 18 may be selectively retained in the raised positions. Of course, both of the shields 16 and 18 may be retained in the raised positions at the same time, if desired.

In operation, the headpiece 12 is disposed on the head of a workman and the support frame 14 may be rotated to a position with the shield that is to be used next disposed over the forehead of the wearer of the headpiece 12. Then, the workman may engage the corresponding portion of the spring clip 82 to release the desired shield in order to swing the latter downwardly in front of his eyes. When it is desired to use the other shield, the shield presently in use is swung upwardly to the retracted position and retained therein by the spring clip 82, the support frame 14 is rotated 180°, and then the other shield 18 is released for downward swinging into position in front of the eyes of the wearer of the headpiece 12. Of course, the shield portion 74 is constructed of transparent material and is adapted to be utilized in conjunction with grinding operations while the shield 16 is opaque except for the light filtering glass 72 and is adapted to be utilized in conjunction with welding operations.

With attention now invited more specifically to FIGS. 5 through 7 of the drawings there will be seen a modified form of shield referred to in general by the reference numeral 110 and which is adapted to be utilized in conjunction with a headpiece in the form of a conventional "hard hat." In order to adapt the hard hat to receive the shield 110, it is only necessary to secure a fastener 134 corresponding to the fastener 34 through the top portion of the hard hat which is referred to in general by the reference numeral 111 and includes a forwardly outwardly curving visor portion 113. A support frame 114 which is similar in construction to the frame 14 and includes a circular ring 146 and circumferentially spaced quarter circular ribs 152 connected at the lower ends to the circular ring 146 and at their upper ends to circumferentially spaced portions of a washer 150. The support frame 14 also includes outwardly projecting threaded shank portions 148 corresponding to the shank portions 48 and a pair of shields 116 and 118 corresponding to the shields 16 and 18 are oscillatably supported from the shank portions 48. Accordingly, it may be seen that portions of the shield 110 which correspond to the shield 10 have been designated by corresponding reference numerals in the 100 series. Further, the shield 10 includes a spring clip 182 corresponding to the clip 82.

However, the support frame 114 does not include components corresponding to the hook portions 56 and accordingly, downward swinging movement of the shield 116 and 118 is limited by contact of the support bands 164 and 160 with the visor portion 113 of the hard hat 111. Otherwise, operation of the shield 110 is substantially identical to the operation of the shield 10.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention as claimed.

What is claimed as new is as follows:

1. In combination, a support defining a downwardly opening cavity and adapted to be supported from the head of a person with his head seated in said cavity, a mount rotatably mounted on said support for angular displacement about an upstanding axis extending generally centrally through said cavity, a pair of shield panels having different light transmitting properties supported on said mount on remote sides of said axis and mounted thereon for swinging movement between raised inoperative positions above said remote sides of said mount and lower operative positions depending downwardly from said remote sides of said mount.

2. The combination of claim 1 wherein said support includes a plurality of elongated arcuate flexible member sections radiating outwardly from an upper central portion of said support and curving downwardly at their free ends, and a lower horizontal annular member to peripherally spaced portions of which said free ends are secured.

3. The combination of claim 1 wherein said support comprises a "hard hat."

4. The combination of claim 1 wherein said mount includes a lower horizontally disposed annular element and a plurality of circumferentially spaced generally quarter circular arcuate elements having one set of ends secured to circumferentially spaced portions of said annular element, said arcuate elements projecting upwardly from said annular element, curving toward each other and joined together at their other set of ends.

5. The combination of claim 1 wherein said mount includes an upper portion, said upper portion including means operative to releasably engage and retain said shield panels in said raised inoperative positions.

6. The combination of claim 1 wherein said shield panels and said mount include coacting means operable to limit downward swinging movement of said shield panels relative to said mount to position with said shield panels disposed in said lowered operative positions.

7. The combination of claim 1 wherein one of said shield panels is substantially fully transparent and the other of said shield panels includes at least a portion thereof to be registered with the eyes of the wearer of said support and having light filtering properties for viewing welding operations therethrough.

8. The combination of claim 1 wherein said shield panels comprise generally partial cylindrical panel members.

9. The combination of claim 1 wherein said mount includes an upper portion, said upper portion including means operative to releasably engage and retain said shield panels in said raised inoperative positions, said shield panels and said mount including coacting means operable to limit downward swinging movement of said shield panels relative to said mount to position with said shield panels disposed in said lowered operative positions.

10. The combination of claim 9 wherein one of said shield panels is substantially fully transparent and the other of said shield panels includes at least a portion thereof to be registered with the eyes of the wearer of said support and having light filtering properties for viewing welding operations therethrough.

References Cited

UNITED STATES PATENTS

| | | | |
|---|---|---|---|
| 1,677,187 | 7/1928 | Leibson | 2—10 |
| 2,421,427 | 6/1947 | Mamlin et al. | 2—5 |
| 2,758,307 | 8/1956 | Treiber | 2—8X |
| 3,237,203 | 3/1966 | Nielsen | 2—10 |
| 3,273,164 | 9/1966 | Thomas | 2—10 |
| 3,369,255 | 2/1968 | Bolle | 2—14R |

JAMES R. BOLER, Primary Examiner

U.S. Cl. X.R.

2—10